US011610332B2

United States Patent
Soni et al.

(10) Patent No.: US 11,610,332 B2
(45) Date of Patent: Mar. 21, 2023

(54) METHOD AND APPARATUS FOR DETECTING A START LOCATION AND END LOCATION OF A BRIDGE

(71) Applicant: HERE Global B.V., Eindhoven (NL)

(72) Inventors: Abhilshit Soni, Gujarat (IN); Akshay Pachaar, Haryana (IN)

(73) Assignee: HERE GLOBAL B.V., Eindhoven (NL)

( * ) Notice: Subject to any disclaimer, the term of this patent is extended or adjusted under 35 U.S.C. 154(b) by 273 days.

(21) Appl. No.: 17/247,750

(22) Filed: Dec. 22, 2020

(65) Prior Publication Data
US 2022/0198699 A1    Jun. 23, 2022

(51) Int. Cl.
    *G06T 7/73*         (2017.01)
    *G06V 20/56*       (2022.01)
    *G06V 20/10*       (2022.01)

(52) U.S. Cl.
    CPC .............. *G06T 7/73* (2017.01); *G06V 20/176* (2022.01); *G06V 20/56* (2022.01);
    (Continued)

(58) Field of Classification Search
    CPC ............. G06T 7/73; G06T 2207/10016; G06T 2207/10032; G06T 2207/30184;
    (Continued)

(56) References Cited

U.S. PATENT DOCUMENTS 6,411,894 B2 * 6/2002 Yamamoto ......... G01C 21/3644
                                                         340/936
8,886,461 B2 * 11/2014 Twardowski .......... G01C 21/32
                                                         701/533
(Continued)

FOREIGN PATENT DOCUMENTS

CN         204946114      *    1/2016             G06T 17/05
CN         204946114 U       1/2016

OTHER PUBLICATIONS

Wimmer et al, ("Automatic Detection and Classification of Safety Barriers in Road Construction Sites using a Laser Scanner", IEEE 2009, pp. 578-583) (Year: 2009).*
(Continued)

*Primary Examiner* — Amara Abdi
(74) *Attorney, Agent, or Firm* — Alston & Bird LLP

(57) ABSTRACT

A method, apparatus and computer program product for detecting a start location and an end location of a bridge are described herein. In the context of a method, one or more sequences of images, at least one sequence of images corresponding with a side barrier portion of the bridge, may be identified from image data corresponding with a probable location of the bridge. Each side barrier portion may comprise a plurality of side barrier segments. The method may identify one or more characteristics of the plurality of side barrier segments. The method may determine the start location and the end location of the bridge based at least in part by identifying characteristic differences of the plurality of side barrier segments. The method may cause transmission of information corresponding with the start location and the end location of the bridge for updating a mapping or navigation system.

20 Claims, 7 Drawing Sheets

(52) U.S. Cl.
CPC ............... *G06T 2207/10016* (2013.01); *G06T 2207/10032* (2013.01); *G06T 2207/30184* (2013.01); *G06T 2207/30252* (2013.01)

(58) Field of Classification Search
CPC . G06T 2207/30252; G06T 2207/20081; G06T 2207/20084; G06T 2207/20221; G06T 7/11; G06T 7/174; G06V 20/176; G06V 20/56
See application file for complete search history.

(56) References Cited

U.S. PATENT DOCUMENTS

| | | | | |
|---|---|---|---|---|
| 2015/0338305 | A1* | 11/2015 | Muncy | G01M 5/0091 73/786 |
| 2016/0379488 | A1* | 12/2016 | Fowe | G08G 1/0112 701/119 |
| 2018/0037221 | A1* | 2/2018 | Myers | G08G 1/0133 |
| 2018/0101177 | A1* | 4/2018 | Cohen | G08G 1/166 |
| 2021/0381911 | A1* | 12/2021 | Ye | G01L 1/00 |

OTHER PUBLICATIONS

Suliman et al., (Automated Inventory of Overhead Assets on Highways using Mobile LiDAR Data, Paper prepared for presentation at the Non-Destructive Methods for LOS Condition monitoring Session of the 2017 Conference of the Transportation Association of Canada), (Year: 2017).*

Gargoum et al., *Automated Inventory of Overhead Assets on Highways Using Mobile LiDAR Data*, 2017 Conference of the Transportation Assoc of Canada (14 pages).

Chen et al., *Automated and Efficient Extraction of Highway Tunnel Lining Cross-sections Using Terrestrial Laser Scanning (TLS)*, Lasers in Eng., vol. 39, pp. 341-353.

* cited by examiner

METHOD AND APPARATUS FOR DETECTING A START LOCATION AND END LOCATION OF A BRIDGE

TECHNOLOGICAL FIELD

The present disclosure generally relates to mapping and navigation applications. Example embodiments relate generally to a method, apparatus and computer program product for programmatically determining a start location and end location of a bridge.

BACKGROUND

A start location and an end location of a bridge are generally determined by human agents manually reviewing large quantities of available image data (e.g., satellite images, aerial imagery, street level imagery and/or the like). In general, image data may be analyzed in order to identify a general location of a bridge (e.g., a stretch of road or geographical area corresponding with the location of a bridge).

However, manual evaluation may be subject to a high degree of error, is time-consuming and inefficient. Additionally, known techniques are unsuitable for accurately and precisely determining a start location and an end location of a bridge in a reliable and consistent manner which may result in incorrect and/or inaccurate information provided to mapping and navigation systems.

BRIEF SUMMARY

A method, apparatus and computer program product are provided for detecting a start location and an end location of a bridge. By programmatically determining the start location and end location of a bridge, accurate information can be provided for mapping and navigation systems.

In an example embodiment, a computer-implemented method for detecting a start location and end location of a bridge is provided, the method comprising: identifying, from image data corresponding with a probable location of the bridge, at least one or more sequences of images corresponding with a side barrier portion of the bridge which comprises a plurality of side barrier segments; identifying one or more characteristics of the plurality of side barrier segments; and determining the start location and the end location of the bridge based at least in part by identifying characteristic differences of the plurality of side barrier segments.

The method may further comprise identifying the probable location of the bridge and obtaining the image data corresponding with the probable location of the bridge. Identifying the probable location of the bridge may comprise identifying a first geographical area corresponding with the start location and identifying a second geographical area corresponding with the end location. Identifying the one or more sequences of images at least one of which corresponds with a side barrier portion of the bridge may comprise analyzing one or more of satellite image data, light detection and ranging (LiDAR) data or geographic data. The image data may comprises images captured by one or more of vehicle sensor(s) and remote sensor(s) within a specified range of the probable location of the bridge. Identifying the one or more characteristics of the plurality of side barrier segments may comprise analyzing the one or more sequences of images pursuant to an image segmentation technique. The one or more characteristics of the plurality of side barrier segments may comprise one or more of color or material characteristics. The method may further comprise causing transmission of information corresponding with the start location and the end location of the bridge for updating a mapping or navigation system In a further example embodiment, a computer program product may be configured to detect a start location and an end location of a bridge. The computer program product may comprise at least one non-transitory computer readable storage medium having computer-executable program code instructions stored therein with the computer-executable program code instructions including program code instructions configured, upon execution, to identify, from image data corresponding with a probable location of the bridge, one or more sequences of images, at least one sequence of images corresponding with a side barrier portion of the bridge, which comprises a plurality of side barrier segments; identify one or more characteristics of the plurality of side barrier segments; and determine the start location and the end location of the bridge based at least in part by identifying characteristic differences of the plurality of side barrier segments.

The program code instructions may also be configured, upon execution, to identify the probable location of the bridge and obtain the image data corresponding with the probable location of the bridge. The program code instructions may also be configured to identify the probable location of the bridge by identifying a first geographical area corresponding with the start location and identifying a second geographical area corresponding with the end location. The program code instructions may also be configured, upon execution, to identify the one or more sequences of images at least one of which corresponds with a side barrier portion of the bridge by analyzing one or more of satellite image data, LiDAR data or geographic data. The image data may comprise images captured by one or more of vehicle sensor(s) and remote sensor(s) within a specified range of the probable location of the bridge.

In yet another example embodiment, an apparatus for detecting a start location and end location of a bridge is provided. The apparatus includes means for identifying, from image data corresponding with a probable location of the bridge, one or more sequences of images, at least one sequence of images corresponding with a side barrier portion of the bridge which comprises a plurality of side barrier segments. The apparatus also includes means for identifying one or more characteristics of the plurality of side barrier segments; and means for determining the start location and the end location of the bridge based at least in part by identifying characteristic differences of the plurality of side barrier segments.

The apparatus may further include means for identifying the probable location of the bridge and means for obtaining the image data corresponding with the probable location of the bridge. The means for identifying the probable location of the bridge may include means for identifying a first geographical area corresponding with the start location and means for identifying a second geographical area corresponding with the end location. The means for identifying the at least one sequence of images which corresponds with a side barrier portion of the bridge may comprise analyzing one or more of satellite image data, light detection and ranging (LiDAR) data or geographic data. The image data may comprises images captured by one or more of vehicle sensor(s) and remote sensor(s) within a specified range of the probable location of the bridge. The means for identifying the one or more characteristics of the plurality of side barrier segments may include means for analyzing the one or more sequences of images pursuant to an image segmentation technique. The one or more characteristics of the plurality of side barrier segments may comprise one or more of color or material characteristics. The apparatus may further include means for causing transmission of information corresponding with the start location and the end location of the bridge for updating a mapping or navigation system.

BRIEF DESCRIPTION OF THE DRAWINGS

Figure 1:
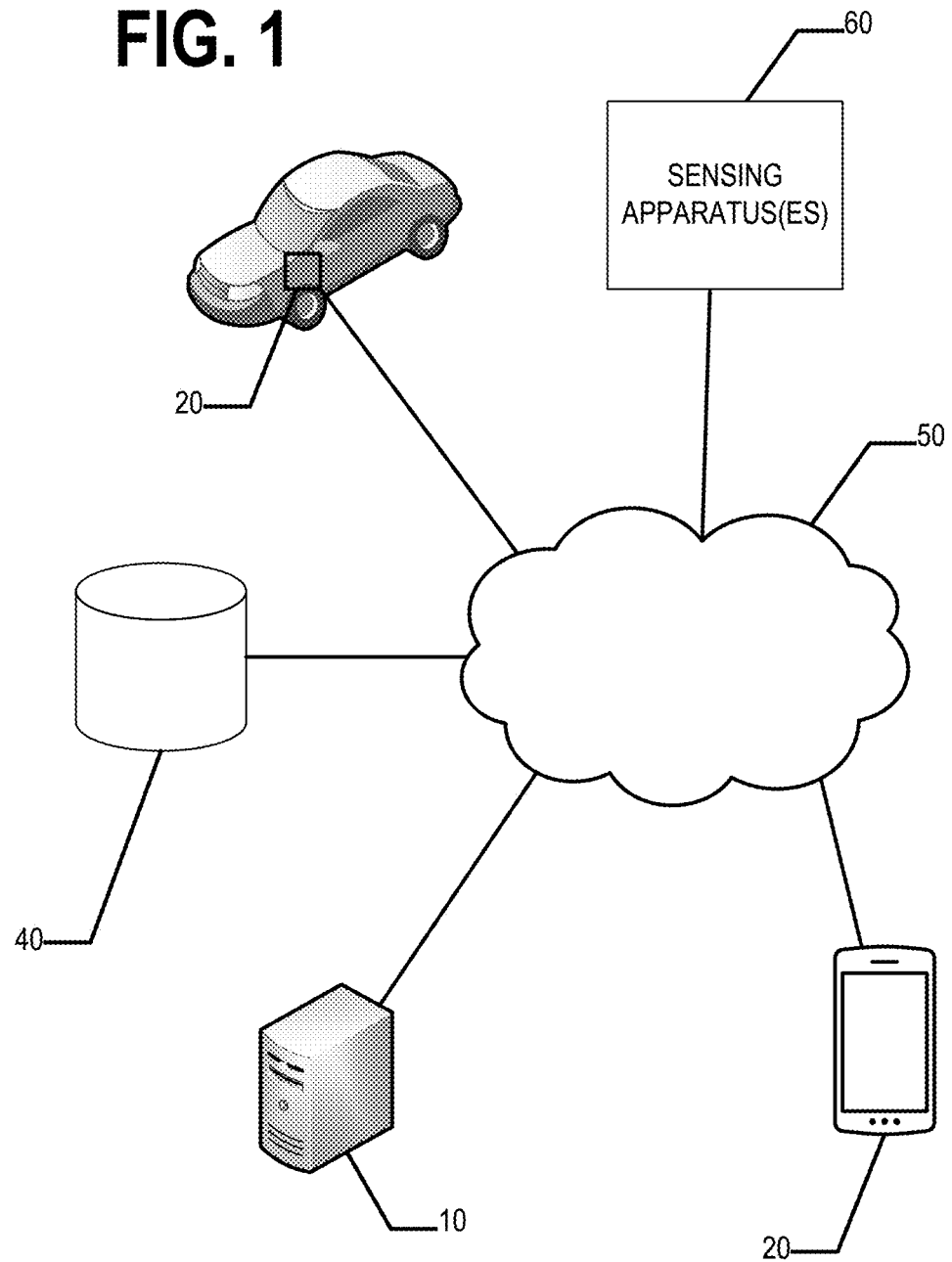
Figure 2A:
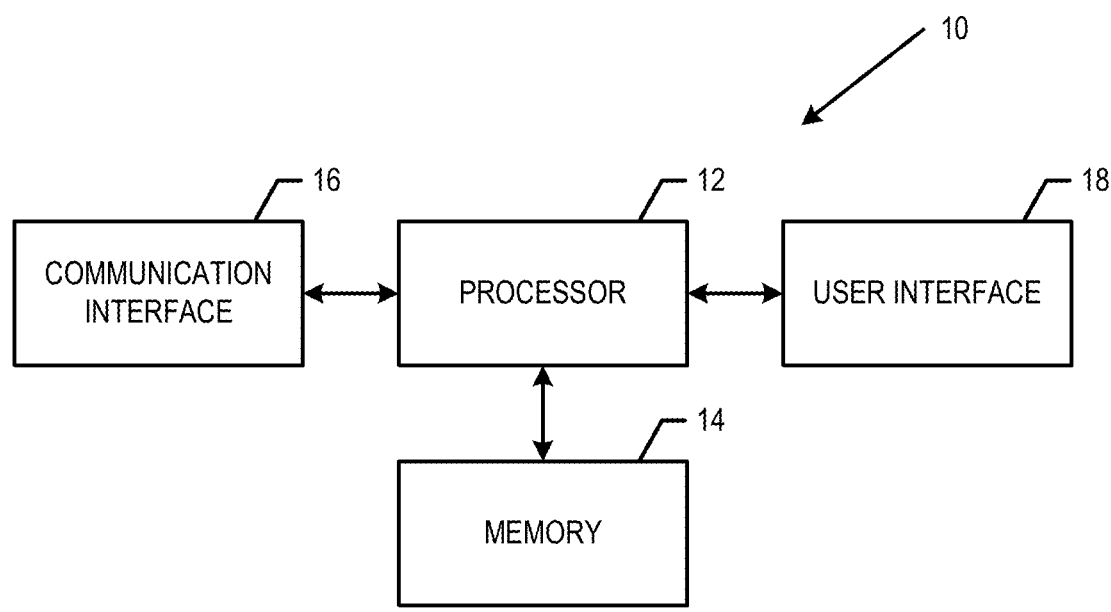
Figure 2B:
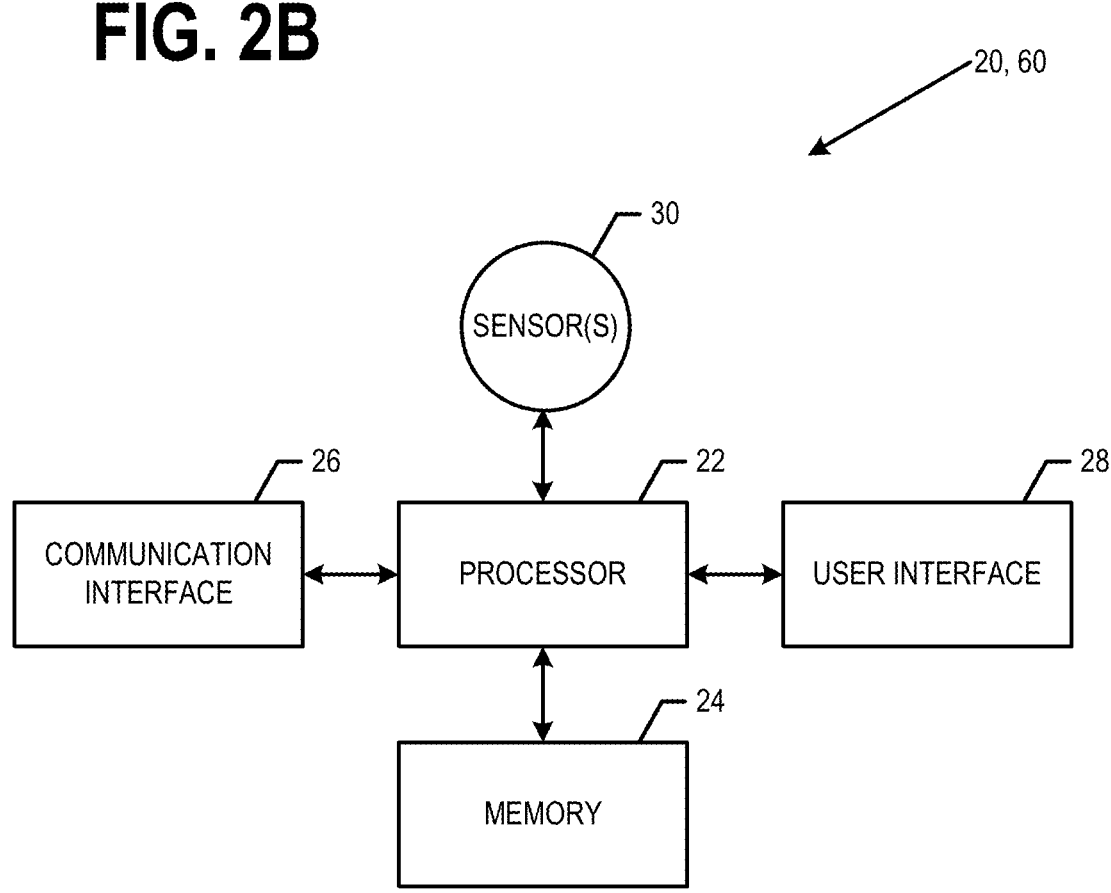

Having thus described certain example embodiments in general terms, reference will hereinafter be made to the accompanying drawings, which are not necessarily drawn to scale, and wherein:

FIG. 1 is a block diagram showing an example architecture of one embodiment of the present invention;

FIG. 2A is a block diagram of a computing entity that may be specifically configured in accordance with an example embodiment;

FIG. 2B is a block diagram of an apparatus that may be specifically configured in accordance with an example embodiment.

Figure 3:
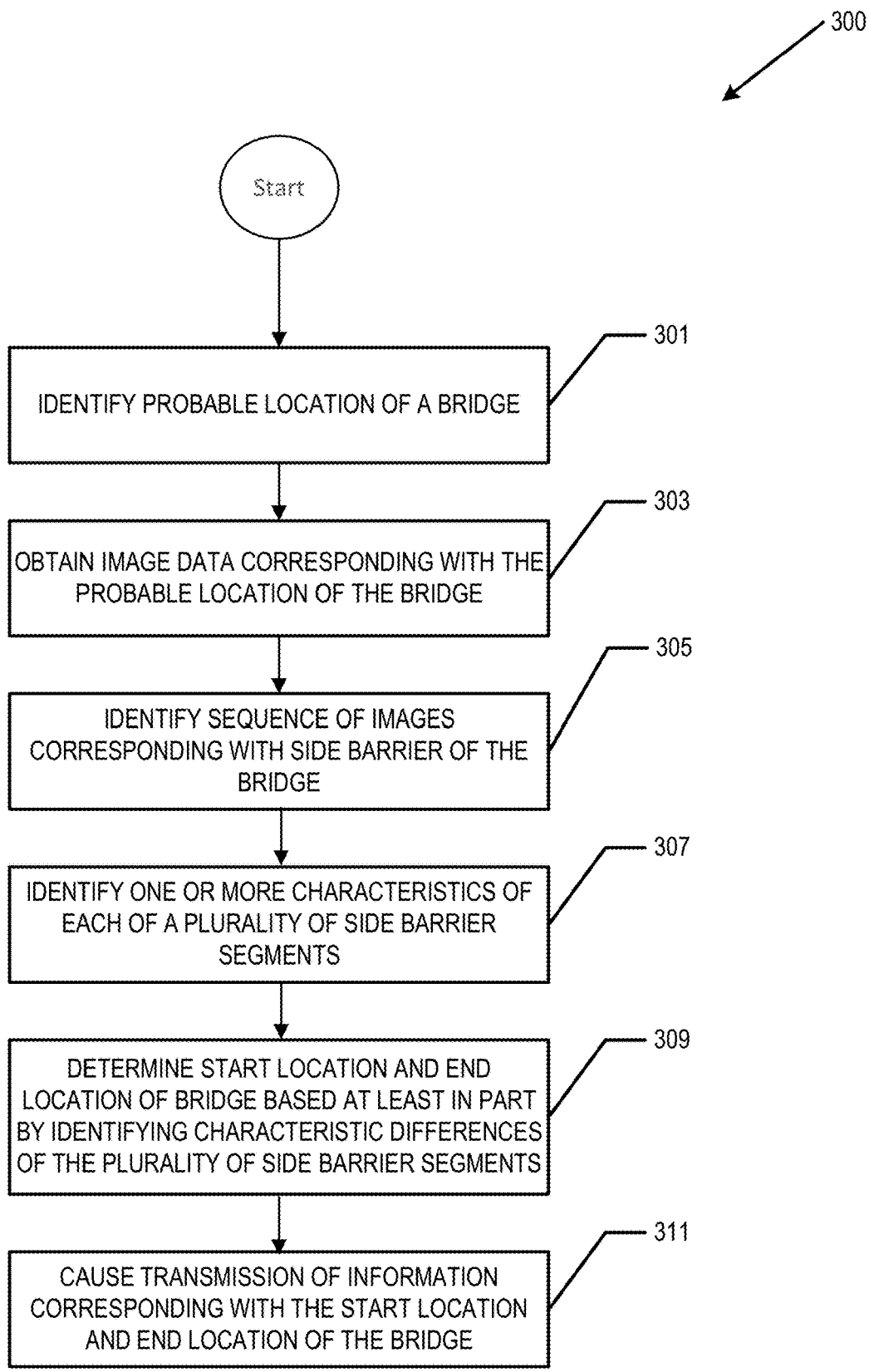
Figure 4:
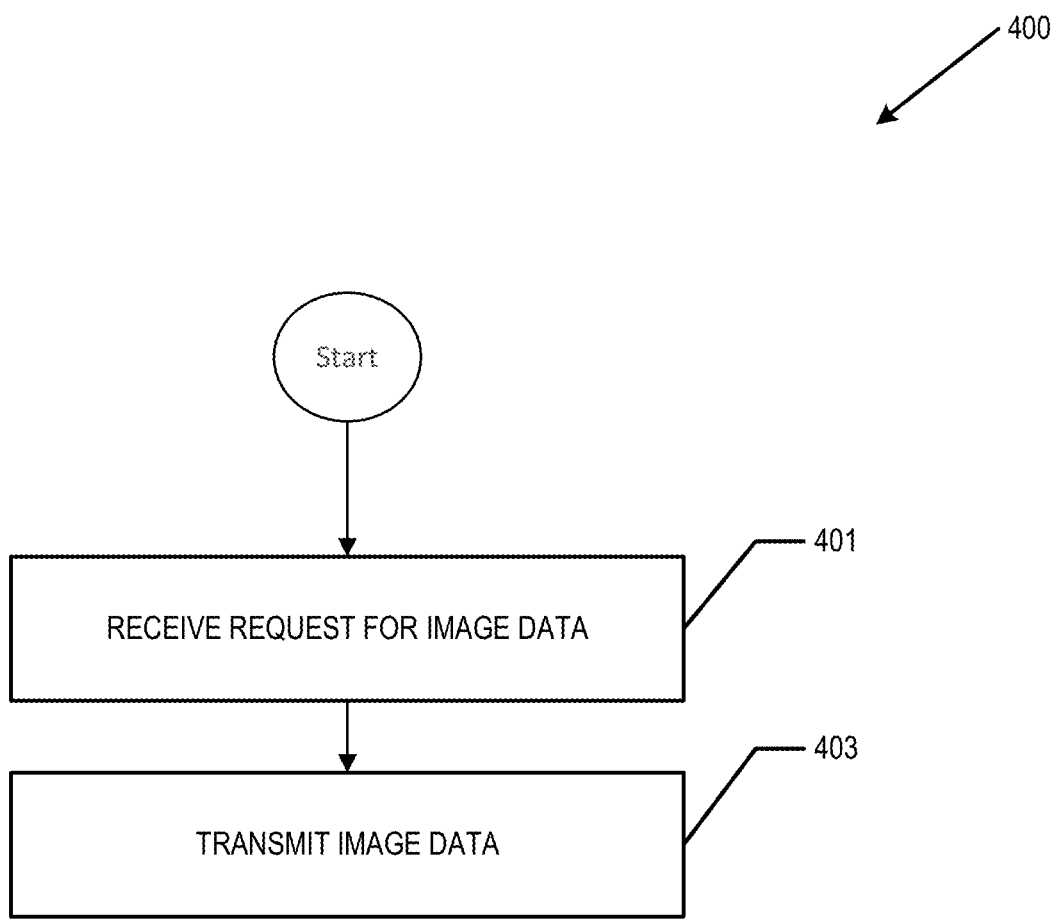
Figure 5:
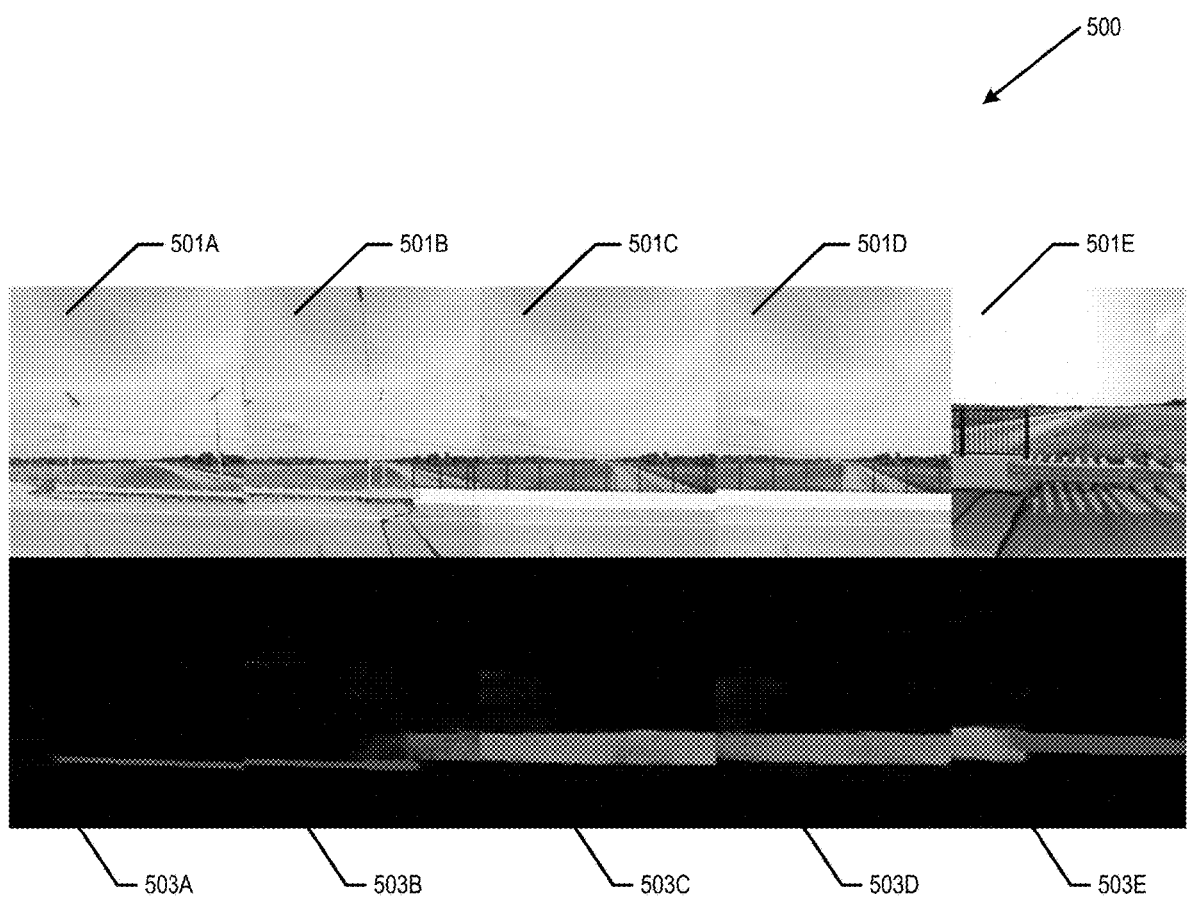
Figure 6:
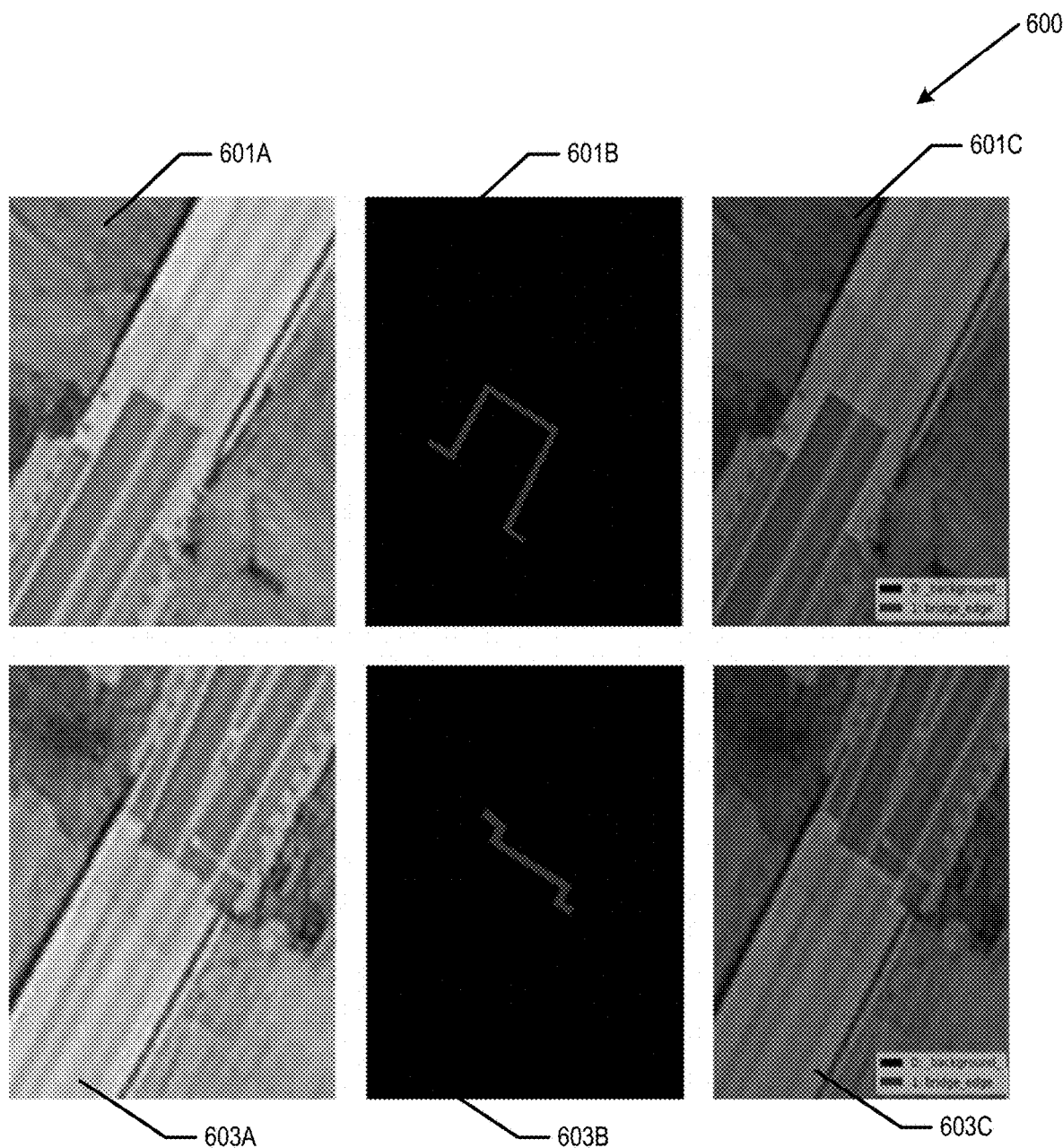

FIG. 3 is a flowchart illustrating operations performed, such as by the computing entity of FIG. 2A, in accordance with an example embodiment;

FIG. 4 is a flowchart illustrating operations performed, such as by an apparatus, in accordance with an example embodiment;

FIG. 5 illustrates an operational example, in accordance with an example embodiment; and FIG. 6 illustrates another operational example, in accordance with an example embodiment.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

I. General Overview

A method, apparatus and computer program product for determining a start location and end location of a bridge are described herein. Though many of the embodiments are described in the context of a bridge, the method, apparatus and computer program product may be utilized to determine a precise location of other types of road objects and landmarks.

FIG. 1 provides an illustration of an example system in which various embodiments of the present invention may be implemented. As shown in FIG. 1, the system may include one or more vehicle apparatuses 20, one or more computing entities 10 (e.g., servers), one or more databases 40, one or more sensing apparatuses 60, one or more networks 50, and/or the like. In various embodiments, the vehicle apparatus 20 may be an in-vehicle navigation system, vehicle control system, a mobile computing device, and/or the like that is onboard and travels with a vehicle. For example, a vehicle apparatus 20 may be an in-vehicle navigation system mounted within and/or on-board a vehicle such as a motor vehicle, automobile, car, scooter, truck, van, bus, motorcycle, bicycle, Segway, golf cart, and/or the like, a non-motor vehicle, etc. In other embodiments, the vehicle apparatus 20 may be a smartphone, tablet, personal digital assistant (PDA), and/or other mobile computing device carried by an occupant of a vehicle. In some embodiments, the one or more sensing apparatuses 60 may be or comprise one or more image sensors configured to capture images of the environment at a location.

As depicted in FIG. 2A, the computing entity 10 may comprise a processor 12, memory 14, and optionally a user interface 18, a communications interface 16, and/or other components configured to perform various operations, procedures, functions or the like described herein. In one example, the computing entity 10 may include an application processor, an image processor, or any other suitable processing means required for functioning of the computing entity 10. While FIG. 2A depicts a single processor, additional processors/processing devices may be included. The processor may include a microprocessor, pre-processors (such as an image pre-processor), graphics processors, a central processing unit (CPU), support circuits, digital signal processors, integrated circuits, memory, or any other types of devices suitable for running applications and for image processing and analysis. In some embodiments, the processor may include any suitable type of single or multi-core processor, microcontroller, central processing unit, and/or the like. Any of the processing devices disclosed herein may be configured to perform certain functions. Configuring a processing device, such as any of the described processors, controllers or microprocessor, to perform certain functions may include programming of computer-executable instructions and making those instructions available to the processing device for execution during operation of the processing device. In some embodiments, configuring a processing device may include programming the processing device directly with architectural instructions. In other embodiments, configuring a processing device may include storing executable instructions on a memory that is accessible to the processing device during operation. For example, the processing device may access the memory to obtain and execute the stored instructions during operation.

In example embodiments, a computing entity 10 may be in communication with the vehicle apparatus 20 and sensing apparatus 60. In various embodiments, the computing entity 10 may be located remotely from the vehicle apparatus 20, while in other embodiments, the computing entity 10 and the vehicle apparatus 20 may be collocated, such as within a vehicle. Each of the components of the system, including one or more vehicle apparatuses 20, one or more sensing apparatuses 60 and one or more computing entities 10, may be in communication with one another over the same or different wireless or wired networks 50 including, for example, a wired or wireless Personal Area Network (PAN), Local Area Network (LAN), Metropolitan Area Network (MAN), Wide Area Network (WAN), cellular network, and/or the like. In some embodiments, a network 50 may comprise the automotive cloud, digital transportation infrastructure (DTI), radio data system (RDS)/ high definition radio (HD) or other digital radio system, and/or the like. For example, a vehicle apparatus 20 or sensing apparatus 60 may be in communication with a computing entity 10 via the network 50 and/or via the Cloud. Similarly, the vehicle apparatus 20 and the sensing apparatus 60 may comprise the same/similar components to those shown in FIG. 2A.

As depicted in FIG. 2B, the vehicle apparatus 20 and the sensing apparatus 60 may each comprise a processor 22, memory 24, a communications interface 26, a user interface 28, one or more sensors 30 (e.g., a location sensor such as a global positioning system (GPS) sensor; camera(s); two dimensional (2D) and/or three dimensional (3D) light detection and ranging (LiDAR) sensor(s); long, medium, and/or short range radio detection and ranging (RADAR) sensor(s); ultrasonic sensors; electromagnetic sensors; (near-) infrared (IR) cameras, 3D cameras, 360° cameras, accelerometer(s), gyroscope(s), and/or other sensors that enable the vehicle apparatus 20 and sensing apparatus 60 to determine one or more features of the corresponding location and/or vehicle's surroundings), and/or other components configured to perform various operations, procedures, functions or the like described herein. Similarly, example embodiments of the computing entity 10, vehicle apparatus 20 and sensing apparatus 60 are described in more detail below with respect to FIGS. 2A and 2B.

II. Example Operations

In example embodiments, the computing entity 10 may be configured to identify a probable location of a bridge. Identifying a probable location of the bridge may comprise identifying a first geographical area corresponding with a start location of the bridge and a second geographical area corresponding with an end location of the bridge. The computing entity 10 may obtain (e.g., request) image data and additional data/information corresponding with the probable location of the bridge. The computing entity 10 may receive and evaluate (e.g., analyze) the image data and the additional data/information in order to identify the probable location of the bridge. The image data and additional data/information may comprise one or more of satellite image data, LiDAR data or geographic data. One or more vehicle apparatuses 20, sensing apparatuses 40 and/or other remote devices may provide (transmit, send) the image data to the computing entity 10. In some embodiments, the computing entity 10 may obtain the image data from one or more databases, such as one or more remote databases 40. Additionally and/or alternatively at least a portion of the image data and/or additional data/information may be stored in memory 14 by the computing entity 10 for operations.

The image data may comprise images captured by one or more vehicle apparatuses 20 (e.g., vehicle sensors) and sensing apparatuses 60 (e.g., remote sensors) within a specified range of the probable location of the bridge. The computing entity 10 may receive and evaluate (e.g., analyze) the image data to identify one or more sequences of images, each respective sequence of images corresponding with a side barrier portion of the bridge. For example, the computing entity 10 may identify a first side barrier portion corresponding with a start location of the bridge and a second side barrier portion corresponding with an end location of the bridge. Each side barrier portion may comprise a plurality of side barrier segments. The computing entity 10 may analyze each respective sequence of images to identify one or more characteristics of the plurality of side barrier segments therein. The computing entity 10 may analyze each of the sequences of images pursuant to an image segmentation technique. The computing entity 10 may determine a start location and end location of the bridge based at least in part by identifying characteristic differences of the plurality of side barrier segments corresponding with each of the sequences of images. In various embodiments, the characteristic differences may be or comprise color or material characteristics. The computing entity 10 may cause transmission of information corresponding with the start location and the end location of the bridge for updating a mapping or navigation system.

FIG. 3 provides a flowchart of operations 300 performed by the computing entity 10, according to an example embodiment.

Beginning at block 301, the computing entity 10 includes means, such as a processor 12, for identifying a probable location of a bridge. An example probable location of a bridge may be or comprise one or more points, lines (e.g., roads) or regions (e.g., polygons) corresponding with a geographical location on a map at which a bridge may be located. In one embodiment, a database 40 may store definitions of a plurality of regions bounded by respective polygons. An example polygon may bound a region that comprises one or more roads within a corresponding portion of the map. Identifying a probable location of a bridge may comprise generating a polygon including the location corresponding with the probable location of a bridge, such as by reference to the database 40. In various embodiments, the computing entity 10, such as the processor 12, may identify (e.g., determine) a geographical region (e.g., polygon) corresponding with one or more geographical locations on a map. An example polygon may comprise one or more roads within a portion of the map. Identifying a probable location of a bridge may comprise identifying a first geographical area (e.g., polygon) corresponding with a start location of the bridge and a second geographical area (e.g., polygon) corresponding with an end location of the bridge. For some bridges, both the start location and the end location may lie within the same geographical area, that is, within the same polygon.

In various embodiments, the computing entity 10 includes means, such as a processor 12 for receiving and evaluating (e.g., analyzing) satellite image data, geographic data (e.g., navigation data, road geometry data and/or the like), LiDAR data, combinations thereof and/or the like to identify predefined characteristics indicative of a bridge. By way of example, the computing entity 10 may identify the probable location of a bridge from satellite image data by identifying a road segment bounded by water segments. In another example, the computing entity 10 may identify the probable location of a bridge from LiDAR data obtained from a vehicle apparatus 20 (e.g., vehicle sensor) traversing a road segment corresponding with the probable location of the bridge. The computing entity 10 may identify the probable location of the bridge by analyzing LiDAR data (e.g., rasterized LiDAR images) obtained by a vehicle apparatus 20 traversing a road segment at a location corresponding with the probable location of the bridge, such as by traversing a road segment that passes over another road segment located therebeneath, such as underneath the bridge. In some embodiments, the probable location of the bridge (e.g., a region or polygon) may be identified from an existing map that provides an indication or demarcation of a bridge. In various embodiments, a geographical area including the location of the bridge may be identified (e.g., by identifying a corresponding stretch of road, a polygon and/or the like). In some embodiments, the computing entity 10 may analyze image data in order to detect shadows indicative of the presence of the bridge.

At block 303, the computing entity 10 includes means, such as the processor 12, the communication interface 16 or the like, for obtaining (e.g., requesting) image data corresponding with the probable location of the bridge. The image data may comprise street level imagery obtained by one or more vehicle apparatuses 20 (e.g., vehicle sensors) or sensing apparatuses 60 (e.g., image sensors) located within a range of the probable location of the bridge. The vehicle apparatus(es) 20 and/or sensing apparatus(es) may be configured to capture images encompassing an area within a target field of view. The vehicle apparatus(es) 20 and/or sensing apparatus(es) may be configured to obtain images from a specified range of the probable location of the bridge and corresponding with a particular geographical direction. In some embodiments, the image data may comprise additional data/information such as metadata, timestamp data, location data and/or the like. In addition to the image data, the computing entity 10 may request additional data/information (e.g., geographic data). The computing entity 10 may obtain (e.g., request) image data comprising or otherwise associated with additional data/information that satisfies one or more parameters. For example, the computing entity 10 may obtain image data comprising metadata, timestamp data, location data (e.g., a latitude and longitude) and/or the like that satisfy one or more parameters, such as image data captured within a predefined recent period of time and associated with a location with a specified range, e.g., a specified distance, of the probable location of the bridge. In some embodiments, the computing entity 10 may obtain the image data from one or more databases, e.g., one or more remote databases 40. Additionally and/or alternatively, the computing entity may include means, such as the memory 14 for storing at least a portion of the image data required for operations. A remote computing entity may aggregate the image data and additional data/information (e.g., metadata, timestamp data, location data, geographic data and/or the like) and transmit the image data and additional data/information to the computing entity 10. In some embodiments, the remote computing entity may continuously or repeatedly update (maintain) a database of available images received from remote devices (e.g., sensing apparatuses 60, vehicle apparatuses 20 and/or the like). In such embodiments, each image in the database 40 may be stored in association with a corresponding location and timestamp. The remote computing entity may receive as input a request for images corresponding with one or more locations or a region (e.g., a polygon) that includes the probable location of the bridge from the computing entity 10. The remote computing entity may obtain and transmit the images to the computing entity 10.

FIG. 4 provides a flowchart of operations 400 performed by an apparatus (e.g., vehicle apparatus 20 or sensing apparatus 60), according to an example embodiment. In some embodiments, the operations 400 may be performed by a remote computing entity (e.g., in communication with one or more databases 40 over the network 50).

Starting at block 401, the apparatus 20, 60 includes means, such as the processor 22, the communication interface 26 or the like, for receiving a request for image data over the network 50. The image data may be captured by the apparatus 20, 60. In various embodiments, the apparatus 20, 60 may be embodied as a vehicle apparatus 20 (e.g., vehicle sensor) and/or sensing apparatuses 60 (e.g., remote sensors, traffic cameras and/or the like) located within a range of the probable location of the bridge or located in a geographical area that includes the probable location of the bridge. In some embodiments, a remote computing entity in communication with one or more remote databases 40 may receive the request for the image data. Additionally and/or alternatively, the computing entity 10 may store at least a portion of the image data in memory 14 (i.e., locally). The computing entity 10 may cause (e.g., trigger) one or more apparatuses 20, 60 located within a specified range of the probable location of the bridge to capture image data via one or more sensors 30. By way of example, the computing entity 10 may cause a vehicle apparatus 20 to capture image data via one or more sensors 30 as it traverses a road or area corresponding with a probable location of the bridge. Additionally and/or alternatively, the computing entity 10 may cause a sensing apparatus 60 (e.g., a stationary sensor positioned within a geographical area that includes the probable location of the bridge) to capture image data via one or more sensors 30. Alternatively, one or more apparatuses 20, 60 may capture the image data without requiring a trigger and the computing entity 10 may signal the one or more apparatuses to provide the image data, or at least the portion of the image data within the specified range, e.g., the specified distance, of the probable location of the bridge.

At block 403, the apparatus 20, 60 includes means, such as the processor 22, the communication interface 26 or the like, for transmitting the image data to the computing entity 10. Alternatively, the image data may be transmitted by the vehicle apparatus(es) 20 and/or sensing apparatus(es) 60 to one or more remote computing entities and/or stored in one or more databases 40. When requested by the computing entity 10, the remote computing entity may obtain the requested image data (e.g., from one or more remote databases 40) and transmit the requested image data to the computing entity 10.

Returning to FIG. 3, at block 305, upon receiving the image data, the computing entity 10 includes means, such as a processor 12 for identifying one or more sequences of images, at least one sequence of images corresponding with a side barrier portion of the bridge. For example, the processor 12 may be configured to process the received information, such as by computer-executable instructions, that indicate which data is to be used in the analysis, provide one or more algorithms or functions for performing the analysis, provide one or more coefficients and/or parameters to be used in accordance with an algorithm for performing the analysis, provide one or more guidelines for providing a response indicating a result of the analysis, and/or the like. In example embodiments, the computer-executable instructions may be configured in accordance with a standardized computer programming language. In an example embodiment, the computer-executable instructions may comprise a reference to a function repository and/or one or more coefficients and/or parameters to be used in the calculation or determination of the result of the referenced instructions, function, or algorithm.

Each side barrier portion of the bridge may correspond with, e.g., include, a plurality of side barrier segments. Safety regulations (e.g., road safety regulations) may require that bridges are guarded by side barriers (e.g., bridge parapets, railing, fence, retaining walls, and/or the like) Side barriers may be or comprise materials including, without limitation, structural steel, reinforced concrete, aluminum, wood and/or the like). The side barriers can be broadly classified as rigid or semi-rigid side barriers. A rigid side barrier does not deflect upon impact whereas a semi-rigid side barrier may deflect to a certain degree upon impact. Accordingly, a bridge may comprise a combination of rigid and semi-rigid side barriers (i.e., side barrier segments) which are placed/located based at least in part on the risk of damage, injury, or death if a vehicle traversing the bridge collides with the particular side barrier segment. For example, if a vehicle collides with a side barrier segment located in the middle of an elevated bridge that is located directly over a body of water, there is a high likelihood of injury and damage (e.g., in the event that the vehicle goes over the bridge and into the body of water) if the side barrier segment were to fail. In contrast, if a vehicle collides with a side barrier segment located close to a start location or an end location of a bridge, but not yet on the bridge itself (e.g., located on land and not significantly elevated), there is a lower likelihood of injury and damage even if the side barrier segment failed. Accordingly, an elevated bridge located directly above a body of water may comprise rigid side barrier segments along the length of the bridge and semi-rigid side barrier segments on land proximate the start location and end location of the bridge. A rigid side barrier segment may be comprised of concrete and similar materials while a semi-rigid barrier segment may be comprised of jersey, metal and similar materials. An example bridge may comprise a continuous rigid side barrier segment along the opposed sides of the bridge with semi-rigid side barriers located on land proximate the start location and end location of the bridge. Another example bridge may comprise a continuous side barrier segment without a different type of side barrier segment indicating a start or end location of the bridge. In general, if the shoulder of a road segment proximate a start location and/or end location of a bridge has at least a particular slope, road safety regulations may mandate that a particular type of side barrier segment be placed at the start location and/or end location. For example, if the shoulder of a road segment leading up to the start location of a bridge has a slope with a ratio of vertical change to horizontal change that is greater than 1:3 (i.e., greater than a 33.3% slope), road safety regulations may require that a side barrier be installed on land proximate the start location.

The computing entity 10 may be configured to analyze metadata, timestamp data, location data and/or the like associated with a plurality of images in order to identify a related sequence of images corresponding with a side barrier portion of the bridge. For example, the computing entity 10 may assemble a set of available images corresponding with a probable location of a bridge based at least in part on timestamp data and/or location data. The computing entity 10 may determine, based at least in part on timestamp data and/or location data that a first related subset of images corresponds with a start location of the bridge and a second related subset of images corresponds with an end location of the bridge. In some embodiments, the computing entity may identify one sequence of images including the entire length of the bridge. In some embodiments, if the available image data is insufficient for operations, the computing entity 10 may request and/or trigger capturing of image data from one or more vehicle apparatus(es) 20 and/or sensing apparatus(es) 60 within a predetermined range of the probable location of the bridge, within range of a target area that encompasses the probable location of the bridge and/or within range of a target field of view that includes at least a portion of the probable location of the bridge. Additionally, the computing entity 10 may filter and/or discard at least a portion of the images based at least in part on whether or not each image was captured within range of the target field of view. For example, the computing entity 10 may identify a plurality of images corresponding with a start location of the bridge and determine that a subset of the plurality of images correspond with and are within range of a particular target field of view (e.g., corresponding with the right hand side of a vehicle while the vehicle traverses a road while driving on the right-hand side of the road). Accordingly, the computing entity 10 may designate the field of view corresponding with the identified subset of the plurality of images as a target field of view. Then, the computing entity 10 may discard images corresponding with a field of view that is outside a specified range of the target field of view (e.g., corresponding with the left hand side of the vehicle while the vehicle traverses the road while driving on the right-hand side of the road).

In some embodiments, the computing entity 10 may identify a first sequence of images including a start location of the bridge and a second sequence of images including an end location of the bridge. The start location and the end location of the bridge may be or comprise one or more points, lines (e.g., edges) or regions (e.g., polygons) corresponding with a geographical location on a map. Each side barrier portion captured in a sequence of images may comprise one or more side barrier segments (e.g., combinations of rigid and semi-rigid barriers defining a frame along a side of the bridge).

At block 307, the computing entity 10 includes means, such as the processor 12, for identifying one or more characteristics of each of a plurality of side barrier segments for each of the side barrier portions. The computing entity 10 may determine characteristic differences of different portions of the bridge based at least in part by analyzing image data (e.g., satellite/aerial images, street level imagery, combinations thereof and/or the like). For example, the computing entity 10 may detect color changes/differences of a plurality of side barrier segments depicted in a sequence of images indicating a transition from one type of side barrier segment to another (e.g., from a rigid side barrier segment to a semi-rigid side barrier segment or from a rigid side barrier segment to no side barrier segment). Additionally, the computing entity 10 may detect characteristic differences between different portions of the bridge (e.g., the start/end location and the center/main body of the bridge) based at least in part on the different construction materials present in the different portions of the bridge as evidenced, for example, by different colors or by other differences attributable to the different materials. By way of example, construction materials for a bridge without land mass support underneath may include reinforced concrete and steel, resulting in the center and/or main portion of the bridge exhibiting one or more distinctive colors. Additionally and/or alternatively, the computing entity 10 may identify the bridge and/or portions of the bridge by analyzing image data in order to detect shadows that are indicative of the presence of the bridge and/or a particular portion of the bridge.

The computing entity 10 may analyze each of the sequences of images pursuant to an automated image segmentation technique implemented by the processor 12 or other computing device. In some embodiments, at least a portion of the analysis may be performed by another remote computing entity. For example, a machine learning model utilizing computer vision algorithm(s) (e.g., a convolutional neural network (CNN)) may be utilized by the processor 12 or other computing device to classify/tag the images. The computing entity 10 may be configured to segment each image in order to identify (e.g., classify) distinct classes of side barriers and/or side barrier characteristics (e.g., rigid, semi-rigid, guard rail, jersey barrier, wall fence and/or the like). The CNN or machine learning model may be trained using a training set of manually analyzed images.

FIG. 5 provides an operational example 500 illustrating an output of image segmentation analysis by the computing entity 10. A sequence of images 501A-E corresponding with a street perspective view of a portion of a bridge is depicted. As shown, each of the images 501A-E is illustrated in conjunction with a corresponding segmentation mask 503A-E (e.g., color coding) depicting identifiable classes of side barrier segments. For example, as shown, a first image 501A corresponds with a segmentation mask 503A that depicts no side barrier segment followed by a semi-rigid side barrier segment. A second image 501B corresponds with a segmentation mask 503B that depicts a semi-rigid side barrier segment and a rigid side barrier segment. A third and fourth image 501C, 501D each correspond with a segmentation mask 503C, 503D, respectively, that depicts a rigid side barrier segment. A fifth image 501E corresponds with a segmentation mask 503E that depicts a rigid side barrier segment and a semi-rigid side barrier segment. The computing entity 10 may identify the start location or end location of the bridge by detecting/identifying transitions (e.g., changes in classes of side barrier segments) in one or more of the images in a sequence of images.

Determining a Start Location and End Location of a Bridge

Returning to FIG. 3, at block 309, the computing entity 10, such as the processor 12, determines the start location and end location of the bridge based at least in part by identifying characteristic differences of the plurality of side barrier segments. By way of example, with reference to FIG. 5, the computing entity 10 may identify the start and end location of the bridge by identifying that the corresponding segmentation mask 503A depicts that there is no side barrier segment followed by a semi-rigid side barrier segment. Accordingly, the computing entity 10 may determine that the image 501A and corresponding segmentation mask 503A correspond with the start location of the bridge. In some embodiments, the computing entity 10 may correlate each side barrier segment with LiDAR data (e.g., point cloud data) in order to generate a depth map to accurately localize the start location and end location of the bridge. For example, the start location and end location of the bridge may be defined by a location (e.g., point, line, edge and/or the like) at which a particular class, type or sequence of side barrier segments is detected and/or a location (e.g., point, line, edge and/or the like) at which color and/or material characteristics of the road surface change. The start location or end location of the bridge may be defined by a point at which a rigid side barrier segment (e.g., comprising a jersey barrier, a rigid reinforced fence and/or the like) is preceded by or followed by a semi-rigid side barrier (e.g., comprising a guard rail). A start location or end location of the bridge may defined by a point at which a rigid side barrier is preceded by or followed by no side barrier segment. For example, the start location or end location of the bridge may be defined by a point at which no side barrier segment is detected. In another example, a start location of the bridge may be defined by a point at which a semi-rigid side barrier segment preceded by no side barrier segment is detected. An end location of the bridge may be defined by a point at which a semi-rigid side barrier segment preceded by a rigid side barrier segment terminates/is no longer detected.

As noted above, a start location or end location of a bridge may be defined by a location (e.g., geographical point, edge and/or the like) at which a change in construction material and/or existence of shadow(s) are detected from image data (e.g., satellite or aerial image data). For example, for a bridge without land mass support underneath, construction materials may comprise reinforced concrete and steel which results in a color difference on the road surface at the location of the bridge.

FIG. 6 provides an operational example 600 illustrating images representing a start location 601A-C and end location 603A-C of the bridge depicted in FIG. 5. As shown, a first image 601A depicts an area corresponding with a start location of the bridge in which a distinct first road surface color corresponding with the road preceding the bridge and second road surface color corresponding with the bridge can be identified. Additionally, shadows are present in the first image 601A depicting the start location of the bridge. A second image 601B illustrates the start location of the bridge determined by the computing entity 10. As shown, the start location of the bridge comprises an edge corresponding with a geographical location on a map in which the edge demarcates separation of the first road surface color corresponding with the road preceding the bridge and the second road surface color corresponding with the bridge depicted in the first image 601A. A third image 601C depicts the geographical location on the map with the identified start location of the bridge overlaid thereon. A fourth image 603A depicts an area corresponding with an end location of the bridge in which a distinct first road surface color corresponding with the bridge and second road surface color corresponding with the road following the bridge can be identified. Additionally, shadows are present in the fourth image 603A depicting the end location of the bridge. A fifth image 603B illustrates the end location of the bridge determined by the computing entity 10. As shown, the end location of the bridge comprises an edge corresponding with a geographical location on a map in which the edge demarcates separation of the first road surface color and the second road surface color depicted in the fourth image 603A. A sixth image 603C depicts the geographical location on the map with the identified end location of the bridge overlaid thereon.

Returning to FIG. 3, at block 311, the computing entity 10 may comprise means, such as the processor 12, communication interface 16 and/or the like, for causing transmission of information corresponding with the determined start location and end location of the bridge. In some embodiments, an indication based at least in part on the determined start location and end location of the bridge may be transmitted to one or more vehicle apparatuses 20 for display in conjunction with a system or application (e.g., navigation system, mapping system and/or the like). In such embodiments, the vehicle apparatus 20 comprises means such as the processor 22, communication interface 26, and/or the like, for receiving instructions (e.g., a message, a signal and/or the like) from the computing entity 10 to cause display of the determined start location and end location of the bridge in conjunction with the system or application (e.g., navigation system, mapping system and/or the like). Display of the determined start location and end location of the bridge may have any of various forms and, in one embodiment, may comprise a message or indication transmitted to the vehicle apparatus(es) 20 or provided in conjunction with the navigation or mapping system. In some embodiments, the computing entity 10, such as the processor 12, may provide instructions or other information causing a stored entry to be provided, such as by causing stored computer instructions to be executed to update the mapping system. An updated map may be provided or transmitted to the one or more vehicle apparatuses 20. For example, the computing entity 10 may comprise means, such as the processor 12, communications interface 16, and/or the like, for providing the updated map. For example, the updated map illustrating the start location and the end location of the bridge may be provided and/or transmitted to a plurality of vehicle apparatuses 20 via the network 50.

Vehicle Apparatus Operation

As discussed above, FIG. 3 provides a flowchart of operations performed by an apparatus (e.g., vehicle apparatus 20, sensing apparatus 60 and/or the like) in communication with the computing entity 10. The vehicle apparatus

20 may be configured to transmit and/or receive information from the computing entity 10, such as by receiving instructions from the computing entity 10. The vehicle apparatus 20 may be configured to utilize or subscribe to a system or application (e.g., a mapping system, navigation system and/or the like) provided by or otherwise supported by the computing entity 10. The example mapping system may comprise computer-executable instructions embedded therein. When the vehicle apparatus 20, on-board a vehicle, traverses within the specified range of probable location of the bridge, computer-executable instructions embedded in or associated with the map may be executed to cause display of the determined start location and end location of the bridge.

The vehicle apparatus 20 may include means, such as the processor 22, for initializing the mapping system or navigation system (e.g. a user may launch an application on a computing device comprising an interactive map). The interactive map, or portions thereof, may be received (e.g. from the computing entity which may, in some embodiments be remote from the vehicle apparatus 20) and stored by the vehicle apparatus 20, such as in memory 24. In some embodiments, the computing entity 10, such as the processor 12, the communication interface 16 or the like, may transmit instructions for updating a copy of the interactive map stored by the vehicle apparatus 20. The interactive map may comprise computer-executable instructions embedded therein or otherwise associated therewith. For example, the vehicle apparatus 20 may comprise means, such as processor 22, memory 24, communications interface 26, and/or the like, for receiving, storing and/or updating the interactive map.

In various embodiments, the vehicle apparatus 20 may be determined to be within a specified range of a location corresponding with a probable location of a bridge such as geographical points, lines or areas, e.g., polygons, of the map. The vehicle apparatus 20 may be, for example, following a route or a predicted route that passes within the specified range of the location corresponding with the probable location of the bridge represented by one or more geographical points, lines or areas on the map.

In some embodiments, the computer-executable instructions may comprise a reference to a function repository stored in association with the map. For example, the function repository may be a reference table, a serialized file, a database, and/or the like. In an example embodiment, the computer-executable instructions may comprise a reference to a function repository stored in the association with the map and one or more coefficients or parameters that are to be used in the calculation or determination of the result of the referenced instructions, function(s), or algorithm(s). In such an embodiment, the referenced instructions, function(s), and/or algorithm(s) may be retrieved and/or accessed from the function repository. For example, the vehicle apparatus 20 may be configured to retrieve and/or access instructions, function(s), and/or algorithm(s) referenced by the computer-executable instructions embedded in the map, from the function repository. For example, the vehicle apparatus 20 may comprise means, such as processor 22, memory 24, and/or the like, for retrieving and/or accessing instructions, function(s), and/or algorithm(s) referenced by the computer-executable instructions, such as the instructions embedded in the map, e.g., a link data record of the map, from the function repository. In some embodiments, the function repository may comprise different instructions based on different road design rules for different countries or geographical or political regions and/or the conventions thereof. In further embodiments, the function repository may consist of different instructions based on the type of vehicle being driven, the time of day, current velocity, and/or the like.

In some example embodiments, the vehicle apparatus 20 may comprise factory programmed instructions, function(s), algorithm(s), and/or the like (e.g., stored in memory 24) that may be defined for global usage (e.g., not defined to be unique with respect to a particular road segment or link) and the embedded computer-executable instructions may comprise one or more coefficients or parameters that are to be used in the calculation or determination of the result of the factory programmed instructions, function(s), or algorithm(s). For example, the factory programmed instructions, function(s), or algorithm(s) may comprise use of sensor information/data collected, captured, gathered, measured, and/or the like by a first sensor of the one or more sensors 30. The embedded computer-executable instructions may cause the vehicle apparatus 20, such as the processor 22, to capture sensor information/data differently along a respective portion of the map than is provided for by the factory programmed instructions, function(s), or algorithm(s).

The vehicle apparatus 20 may be configured to transmit a response that includes or is otherwise based on the sensor data. The computer-executable instructions may be executed by the processor 22 to cause analysis of at least a portion of the sensor information/data collected, captured, gathered, measured, and/or the like by the one or more sensors 30 as the vehicle traversed the road segment that passes within a specified range of a location corresponding with the probable location of the bridge and transmission of a response. A response may be transmitted via the network 50, such as to the computing entity 10. For example, the vehicle apparatus 20 may comprise means, such as the processor 22, communications interface 26, and/or the like, for providing a response including, in some embodiments, the sensor data and location data indicating the location at which the sensor data was collected (and, in some instances) a time stamp indicating the time at which the sensor data was collected. In example embodiments, the computing entity 10 may be configured to receive the response from the vehicle apparatus 20. In example embodiments, a response may comprise the sensor data and/or an indication of a result of the analysis of sensor information/data that was caused by execution of the computer-executable instructions embedded in or associated with the map corresponding to the particular portion of the map (e.g. location corresponding with the probable location of the bridge).

Additionally, a response may comprise vehicle identification information/data. For example, a response may indicate the type, make, model, trim package, year and/or the like of the vehicle associated with the vehicle apparatus 20, a sensor configuration associated with the vehicle apparatus 20, and/or the like. In some embodiments, the computing entity 10, such as the processor 12, may determine and execute computer-executable instructions that are adapted to analyze the sensor data in a manner that is tailored for a particular type, make, model, trim package, year and/or the like of vehicle or a particular type of sensor configuration associated with the vehicle apparatus 20. As should be understood, in various embodiments, the response may comprise various information/data identifying the vehicle apparatus 20 and/or the corresponding vehicle such that, if desired, the computer-executable instructions assigned to particular portions of the map may be adapted or optimized for a particular vehicle type, make, model, trim package, year, and/or the like and/or a particular sensor configuration associated with the vehicle apparatus 20.

In various embodiments, a response may comprise various other information/data associated with the vehicle and/or the vehicle apparatus 20; the result of the analysis caused by the execution of the computer-executable instructions; the result of the analysis caused by factory programmed instructions, functions, or algorithms; and/or the like, as appropriate for the application.

The vehicle apparatus 20 may include means, such as the processor 22, the communications interface 26 or the like, for receiving a message to cause display of a start location and end location of a bridge, from the computing entity 10. In an example embodiment, the message may comprise an update to the interactive map/mapping system, a message/alert and/or the like. Based upon the message including, for example, an updated map, associated with a location, a message may be presented to the driver of the vehicle, such as by the display associated with a navigation or mapping system, audibly via a vehicle entertainment system or the like. Once the computing entity 10 has updated a map/mapping system with the start location and end location of a bridge, corresponding information may be presented to the vehicle and/or the driver of the vehicle in all instances. Alternatively, the information may only be presented to the vehicle and/or the driver of the vehicle in an instance in which the vehicle is proximate the probable location of the bridge, such as within a predefined distance of the probable location of the bridge, and/or in an instance in which the predefined route along which the vehicle is travelling passes within a predefined distance of the location.

III. Example Apparatuses

The vehicle apparatus 20, sensing apparatus 60 and/or computing entity 10 of an example embodiment may be embodied by or associated with a variety of computing devices. The vehicle apparatus 20 may be embodied, for example, by a navigation system including an in-vehicle navigation system, a vehicle control system, a personal navigation device (PND) or a portable navigation device, an advanced driver assistance system (ADAS), a global positioning system (GPS), a cellular telephone, a mobile phone, a personal digital assistant (PDA), a watch, a camera, a computer, and/or other device that can perform navigation-related functions, such as digital routing and map display. The computing entity 10 may be embodied in other types of computing devices, such as a server, a personal computer, a computer workstation, a laptop computer, a plurality of networked computing devices or the like, that are configured to identify a location corresponding with a probable location of a bridge and to provide an indication in an instance in which a vehicle is near a location corresponding with a probable location of a bridge or has a route that extends through the location.

In this regard, FIG. 2A depicts a computing entity 10 and FIG. 2B depicts a vehicle apparatus 20 or a sensing apparatus 60 of an example embodiment that may be embodied by various computing devices including those identified above. As shown, the computing entity 10 of an example embodiment may include, may be associated with or may otherwise be in communication with a processor 12 and a memory device 14 and optionally a communication interface 16 and/or a user interface 18. Similarly, a vehicle apparatus 20 or a sensing apparatus 60 of an example embodiment may include, may be associated with, or may otherwise be in communication with a processor 22, and a memory device 24, and optionally a communication interface 26, a user interface 28, and/or one or more sensors 30 (e.g., a location sensor such as a GPS sensor; camera(s); 2D and/or 3D LiDAR(s); long, medium, and/or short range RADAR; ultrasonic sensors; electromagnetic sensors; (near-)IR cameras, 3D cameras, 360° cameras, accelerometer(s), gyroscope(s), and/or other sensors that enable the vehicle apparatus 20 or sensing apparatus 60 to determine one or more features of the corresponding apparatus's surroundings).

In some embodiments, the processor 12, 22 (and/or co-processors or any other processing circuitry assisting or otherwise associated with the processor) may be in communication with the memory device 14, 24 via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 12, 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 12, 22 may be configured to execute instructions stored in the memory device 14, 24 or otherwise accessible to the processor. For example, the processor 22 may be configured to execute computer-executed instructions embedded within a link record of a map tile. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a pass-through display or a mobile terminal) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the computing entity 10 and/or vehicle apparatus 20 may include a user interface 18, 28 that may, in turn, be in communication with the processor 12, 22 to provide output to the user, such as a proposed route, and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (e.g., software and/or firmware) stored on a memory accessible to the processor (e.g., memory device 14, 24, and/or the like).

The computing entity 10, sensing apparatus 60 and/or the vehicle apparatus 20 may optionally include a communication interface 16, 26. The communication interface 16, 26 may be any means such as a device or circuitry embodied in either hardware or a combination of hardware and software that is configured to receive and/or transmit data from/to a network and/or any other device or module in communication with the apparatus. In this regard, the communication interface 16, 26 may include, for example, an antenna (or multiple antennas) and supporting hardware and/or software for enabling communications with a wireless communication network. Additionally or alternatively, the communication interface 16, 26 may include the circuitry for interacting with the antenna(s) to cause transmission of signals via the antenna(s) or to handle receipt of signals received via the antenna(s). In some environments, the communication interface 16, 26 may alternatively or also support wired communication. As such, for example, the communication interface may include a communication modem and/or other hardware/software for supporting communication via cable, digital subscriber line (DSL), universal serial bus (USB) or other mechanisms.

In addition to embodying the computing entity 10 and/or vehicle apparatus 20 of an example embodiment, a navigation system may also include or have access to a geographic database that includes a variety of data (e.g., map information/data) utilized in constructing a route or navigation path and determining the time to traverse the route or navigation path. For example, a geographic database may include data records, road segment or link data records, point of interest (POI) data records and other data records. More, fewer or different data records can be provided. In one embodiment, the other data records include cartographic ("carto") data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. In example embodiments, the data records (e.g., node data records, link data records, POI data records, and/or other data records) may comprise computer-executable instructions, a reference to an function repository that comprises computer-executable instructions, one or more coefficients and/or parameters to be used in accordance with an algorithm for performing the analysis, one or more response criteria for providing a response indicating a result of the analysis, and/or the like. In example embodiments, the vehicle apparatus 20 may be configured to execute computer-executable instructions provided by and/or referred to by a data record. In example embodiments, the computing entity 10 may be configured to modify, update, and/or the like one or more data records of the geographic database.

In an example embodiment, the data records represent and comprise road networks, roads, streets, paths and the like, such as used by vehicles, cars, and/or other entities. The roads, streets, and the like may be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database can include data about the POIs and their respective locations in the POI data records. The geographic database can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the geographic database can include and/or be associated with event data (e.g., traffic incidents, constructions, scheduled events, unscheduled events, etc.) associated with the POI data records or other records of the geographic database.

The geographic database can be maintained by the content provider (e.g., a map developer) in association with the services platform. By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used. In example embodiments, the geographic database may be updated based on information/data provided by one or more vehicle apparatuses. For example, the computing entity 10 may update the geographic database based on a most preferred version map tile as determined from a plurality of responses received from a plurality of vehicle apparatuses 20, as described elsewhere herein.

The geographic database can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions. The navigation-related functions can correspond to vehicle navigation or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases. Regardless of the manner in which the databases are compiled and maintained, a navigation system that embodies a vehicle apparatus 20 in accordance with an example embodiment may determine the time to traverse a route that includes one or more turns at respective intersections more accurately.

IV. Apparatus, Methods, and Computer Program Products

As described above, FIGS. 3 and 4 illustrate flowcharts of apparatuses 10, 20, 60, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 14 of an apparatus employing an embodiment of the present invention and executed by the processor 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A computer-implemented method for detecting a start location and end location of a bridge, the method comprising:
identifying, from image data corresponding with a probable location of the bridge, one or more sequences of images, at least one sequence of images corresponding with a side barrier portion of the bridge which comprises a plurality of side barrier segments;
identifying one or more characteristics of the plurality of side barrier segments; and
determining the start location and the end location of the bridge based at least in part by identifying characteristic differences of the plurality of side barrier segments.

2. The computer-implemented method of claim 1, further comprising:
identifying the probable location of the bridge; and
obtaining the image data corresponding with the probable location of the bridge.

3. The computer-implemented method of claim 1, wherein identifying the probable location of the bridge comprises identifying a first geographical area corresponding with the start location and identifying a second geographical area corresponding with the end location.

4. The computer-implemented method of claim 1, wherein identifying the one or more sequences of images at least one of which corresponds with a side barrier portion of the bridge comprises analyzing one or more of satellite image data, light detection and ranging (LiDAR) data or geographic data.

5. The computer-implemented method of claim 1, wherein the image data comprises images captured by one or more of vehicle sensor(s) and remote sensor(s) within a specified range of the probable location of the bridge.

6. The computer-implemented method of claim 1, wherein identifying the one or more characteristics of the plurality of side barrier segments comprises analyzing the one or more sequences of images pursuant to an image segmentation technique.

7. The computer-implemented method of claim 6, wherein the one or more characteristics of the plurality of side barrier segments comprises one or more of color or material characteristics.

8. The computer-implemented method of claim 1, further comprising:
    causing transmission of information corresponding with the start location and the end location of the bridge for updating a mapping or navigation system.

9. An apparatus configured to detect a start location and end location of a bridge, the apparatus comprising processing circuitry and at least one memory including computer program code instructions, the computer program code instructions configured to, when executed by the processing circuitry, cause the apparatus to:
    identify, from image data corresponding with a probable location of the bridge, one or more sequences of images, at least one sequence of images corresponding with a side barrier portion of the bridge which comprises a plurality of side barrier segments;
    identify one or more characteristics of the plurality of side barrier segments; and
    determine the start location and the end location of the bridge based at least in part by identifying characteristic differences of the plurality of side barrier segments.

10. The apparatus according to claim 9, wherein the computer program code instructions are further configured to, when executed by the processing circuitry, cause the apparatus to:
    identify the probable location of the bridge; and
    obtain the image data corresponding with the probable location of the bridge.

11. The apparatus according to claim 9, wherein the apparatus is caused to identify the probable location of the bridge by identifying a first a first geographical area corresponding with the start location and identifying a second geographical area corresponding with the end location.

12. The apparatus according to claim 9, wherein the apparatus is caused to identify the one or more sequences of images at least one of which corresponds with a side barrier portion of the bridge by analyzing one or more of satellite image data, light detection and ranging (LiDAR) data or geographic data.

13. The apparatus according to claim 9, wherein the image data comprises images captured by one or more of vehicle sensor(s) and remote sensor(s) within a specified range of the probable location of the bridge.

14. The apparatus according to claim 9, wherein the apparatus is caused to identify the one or more characteristics the plurality of side barrier segments by analyzing the one or more sequences of images pursuant to an image segmentation technique.

15. The apparatus according to claim 14, wherein the one or more characteristics of the plurality of side barrier segments comprises one or more of color or material characteristics.

16. A computer program product configured to detect a start location and end location of a bridge, the computer program product comprising at least one non-transitory computer-readable storage medium having computer executable program code instructions therein, the computer executable program code instructions comprising program code instructions configured, upon execution, to:
    identify, from image data corresponding with a probable location of the bridge, at least one sequence of images, at least one sequence of images corresponding with a side barrier portion of the bridge which comprises a plurality of side barrier segments;
    identify one or more characteristics of the plurality of side barrier segments; and
    determine the start location and the end location of the bridge based at least in part by identifying characteristic differences of the plurality of side barrier segments.

17. The computer program product according to claim 16, wherein the computer program code instructions further comprise program code instructions configured, upon execution, to:
    identify the probable location of the bridge; and
    obtain the image data corresponding with the probable location of the bridge.

18. The computer program product according to claim 16, wherein the instructions configured to identify the probable location of the bridge further comprise instructions configured upon execution, to identify a first geographical area corresponding with the start location and identify a second geographical area corresponding with the end location.

19. The computer program product according to claim 16, wherein the instructions configured to identify the one or more sequences of images at least one of which corresponds with a side barrier portion of the bridge further comprise program code instructions configured, upon execution, to analyze one or more of satellite image data, light detection and ranging (LiDAR) data or geographic data.

20. The computer program product according to claim 16, wherein the image data comprises images captured by one or more of vehicle sensor(s) and remote sensor(s) within a specified range of the probable location of the bridge.

* * * * *

UNITED STATES PATENT AND TRADEMARK OFFICE
CERTIFICATE OF CORRECTION

PATENT NO. : 11,610,332 B2
APPLICATION NO. : 17/247750
DATED : March 21, 2023
INVENTOR(S) : Abhilshit Soni et al.

It is certified that error appears in the above-identified patent and that said Letters Patent is hereby corrected as shown below:

In the Claims

In Column 21, Line 36, Claim 11, delete "a first a first" and insert -- a first --, therefor.

In Column 22, Line 1, Claim 14, delete "the plurality" and insert -- of the plurality --, therefor.

Signed and Sealed this
Seventh Day of November, 2023

Katherine Kelly Vidal
*Director of the United States Patent and Trademark Office*